United States Patent [19]
Shinoda

[11] Patent Number: 6,075,301
[45] Date of Patent: Jun. 13, 2000

[54] COMPACT MOTOR

[75] Inventor: Takeshi Shinoda, Tokyo, Japan

[73] Assignee: Mitsomi Electric Co., Ltd., Japan

[21] Appl. No.: 09/163,538

[22] Filed: Sep. 30, 1998

[30] Foreign Application Priority Data

Sep. 30, 1997 [JP] Japan ..................................... 9-282945

[51] Int. Cl.[7] ................................................. H02K 1/18
[52] U.S. Cl. .............................. 310/154; 310/89; 310/42; 310/254; 310/67 R
[58] Field of Search ..................................... 310/152, 154, 310/156, 42, 43, 218, 254, 67 R, 89

[56] References Cited

U.S. PATENT DOCUMENTS

| | | | |
|---|---|---|---|
| 3,828,212 | 8/1974 | Harkness et al. | 310/153 |
| 4,071,794 | 1/1978 | Schoen | 310/154 |
| 4,219,752 | 8/1980 | Katou | 310/156 |
| 4,665,333 | 5/1987 | Heim et al. | 310/154 |
| 4,748,358 | 5/1988 | Ruehle et al. | 310/154 |
| 4,851,729 | 7/1989 | Baines | 310/239 |
| 5,105,114 | 4/1992 | Sickle et al. | 310/154 |
| 5,391,063 | 2/1995 | Hantle et al. | 417/423.7 |
| 5,675,204 | 10/1997 | Kusumoto et al. | 310/154 |

*Primary Examiner*—Elvin Enad
*Assistant Examiner*—Bert Mullins
*Attorney, Agent, or Firm*—Morrison Law Firm

[57] ABSTRACT

A pair of C-shaped magnets are fitted to a resin holder and inserted as a unit into a cup-shaped motor case. The resin holder has a diameter that is slightly greater than the inside diameter of the motor case, but includes resilient elements that are compressible during insertion of the resin holder and the magnets. After insertion the resilient elements urge the resin holder and the magnets into frictional contact with the inside of the motor case, thereby retaining the magnets in place without the need for adhesive. A U-shaped groove in the resin holder is engaged by a positioning projection in the motor case to establish the rotational positioning of the resin holder and thereby the rotational positioning of the C-shaped magnets. A rotor is rotationally fixed in the motor case on a shaft which rotates in the motor case at one end and in a bracket covering the open end of the motor case at the other end.

11 Claims, 3 Drawing Sheets

COMPACT MOTOR

BACKGROUND OF THE INVENTION

The present invention relates to a compact motor. More specifically, the present invention relates to an attachment structure for C-shaped magnets for a compact motor.

Referring to FIG. 3, there is shown a well known technology for compact motors. A C-shaped magnet B, which has opposing poles along its circumference, is positioned inside a motor case A. Motor case A is press-formed in the shape of a cup. A rotor D is attached to a shaft C inside C-shaped magnet B.

A pair of bearings E1, E2 rotatably support shaft C between an end wall of motor case A and a bracket F. Bracket F covers an open portion of motor case A. A star-shaped layered core G, an excitation coil H, and a commutator I are supported at an intermediate portion of shaft C.

Brushes J are supported by an insulative resin mold K inside bracket F. Ends j of brushes J form a sliding contact with commutator I. Brushes J are electrically connected to leads L which extend outside motor case A.

The conventional method for fixing C-shaped magnet B to motor case A has involved aligning a notch M formed on C-shaped magnet B with an embossed projection N formed on motor case A. With the rotational position of C-shaped magnet B relative to motor case A defined in this manner, C-shaped magnet B is fixed to the inner surface of motor case A using an adhesive.

However, in this fixing structure for C-shaped magnet B, the use of adhesive complicates the assembly process. The adhesive may peel off later and make the positioning of C-shaped magnet B unstable. In particular, when a plurality of C-shaped magnets are to be attached inside a compact motor, the peeling off of adhesive can lead later to critical problems. Thus, accurately fixing a plurality of C-shaped magnets to prescribed positions has been difficult.

OBJECTS AND SUMMARY OF THE INVENTION

It is an object of the present invention to overcome the problems in the conventional method for attaching C-shaped magnets as described above. A further object of the present invention is to provide a structure to accurately attach a plurality of C-shaped magnets inside a motor case without using adhesives.

In order to achieve this objective, at least one C-shaped magnet is positioned inside a motor case molded in the shape of a cup. A rotor is fixed to an intermediate portion on a shaft. The shaft is rotatably supported between the motor case and a bracket covering an open portion of the motor case. A ring-shaped resin holder, which has its rotational positioning restricted, is positioned inside the motor case via positioning means disposed on the motor case. A support is formed integrally with the resin holder. The C-shaped magnet is fixed to the support.

In a preferred embodiment of the present invention described below, the resin holder includes a plurality of arcuate rigid supports and flexible members connecting these rigid supports. On the circumferential ends of the rigid supports are formed support pieces that engage the end surfaces of the C-shaped magnet. The flexible members include U-shaped members connected on either end to the rigid supports. A positioning projection on the motor case is positioned in the groove of the U-shaped member.

Briefly stated, the present invention provides a pair of C-shaped magnets that are fitted to a resin holder and inserted as a unit into a cup-shaped motor case. The resin holder has a diameter that is slightly greater than the inside diameter of the motor case, but includes resilient elements that are compressible during insertion of the resin holder and the magnets. After insertion the resilient elements urge the resin holder and the magnets into frictional contact with the inside of the motor case, thereby retaining the magnets in place without the need for adhesive. A U-shaped groove in the resin holder is engaged by a positioning projection in the motor case to establish the rotational positioning of the resin holder and thereby the rotational positioning of the C-shaped magnets. A rotor is rotationally fixed in the motor case on a shaft which rotates in the motor case at one end and in a bracket covering the open end of the motor case at the other end.

According to an embodiment of the invention, there is provided a compact motor comprising: a generally cup-shaped motor case, at least one C-shaped magnet inside the motor case, a rotor fixed to an intermediate portion of a shaft, means for rotatably supporting the shaft in the motor case, a ring-shaped resin holder, the motor case and the ring-shaped resin holder including engaging means for establishing a rotational position of the ring-shaped resin holder in the motor case, a support integrally formed in the ring-shaped resin holder to which the at least one C-shaped magnet is fittable, and the ring-shaped resin holder and the at least one C-shaped magnet being insertable as a unit into the cup-shaped motor case, whereby installation and rotational positioning of the at least one C-shaped magnet is simplified.

According to a feature of the invention, there is provided a stator for a compact motor comprising: a cup-shaped motor case, the cup-shaped motor case having an open end and a generally cylindrical inner surface, a resin holder, the resin holder including first and second arcuate rigid supports, at least one flexible member joining ends of the first and second arcuate rigid supports to form a generally ring-shaped resin holder having a diameter slightly larger than the inner surface, the at least one flexible member including a U-shaped member having first and second flexible support pieces forming a U shape, the at least one flexible member having sufficient flexibility to permit compression of the resin holder enough to reduce an outside diameter of the resin holder sufficiently to permit insertion of the resin holder into the cup-shaped motor case, and sufficient resiliency to thereafter urge the resin holder outward into frictional contact with the inner surface, first and second C-shaped magnets, the first and second C-shaped magnets having an outside curvature generally the same as the inner surface, first and second rigid support pieces dependent from the first arcuate rigid support, opposed ends of the first C-shaped magnet being fittable against the first and second rigid support pieces, third and fourth rigid support pieces dependent from the second arcuate rigid support, opposed ends of the second C-shaped magnet being fittable against the third and fourth rigid support pieces, the first and second C-shaped magnets and the resin holder being supportable as a unit by a hand of an installer, whereby installation of the resin holder and the first and second C-shaped magnets is enabled, a positioning projection depending from a closed end of the cup-shaped motor case, and the positioning projection fitting into the U shape when proper orientation of the C-shaped magnets is attained.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
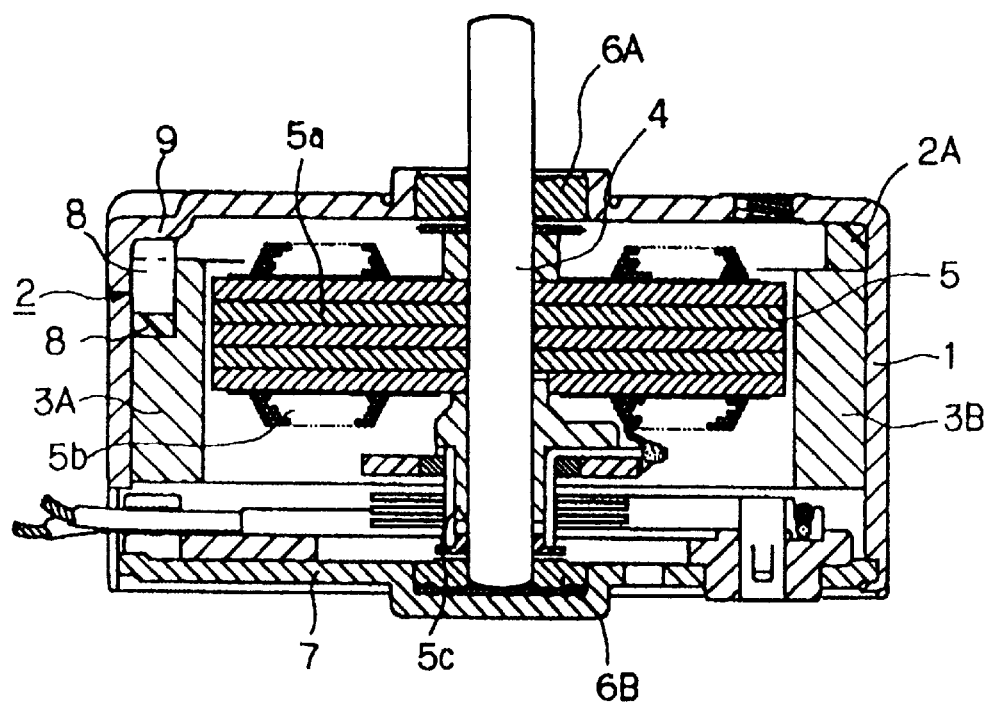
FIG. 1 is a cross-section drawing of a compact motor according to the present invention.
Figure 2:
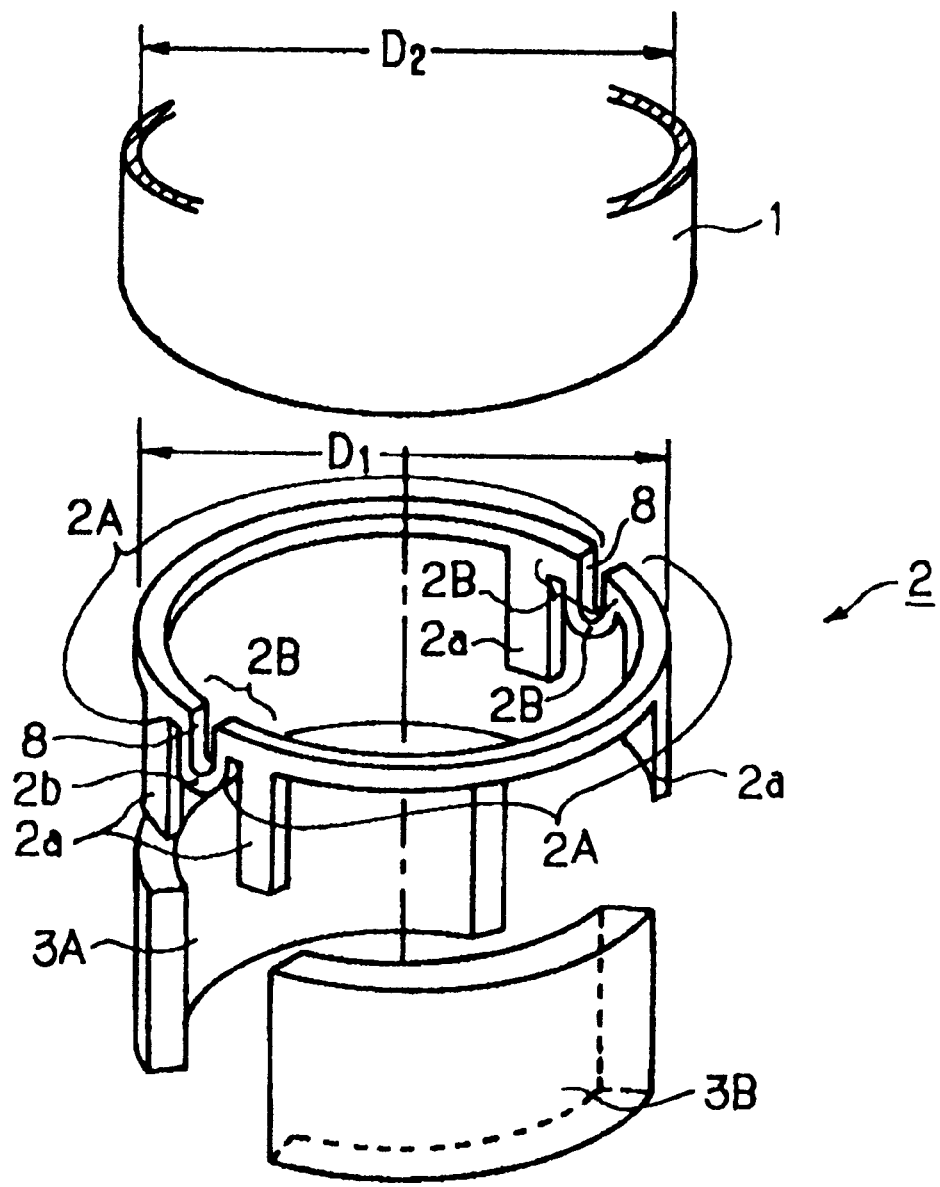
FIG. 2 is an exploded perspective drawing of the compact motor.
Figure 3:
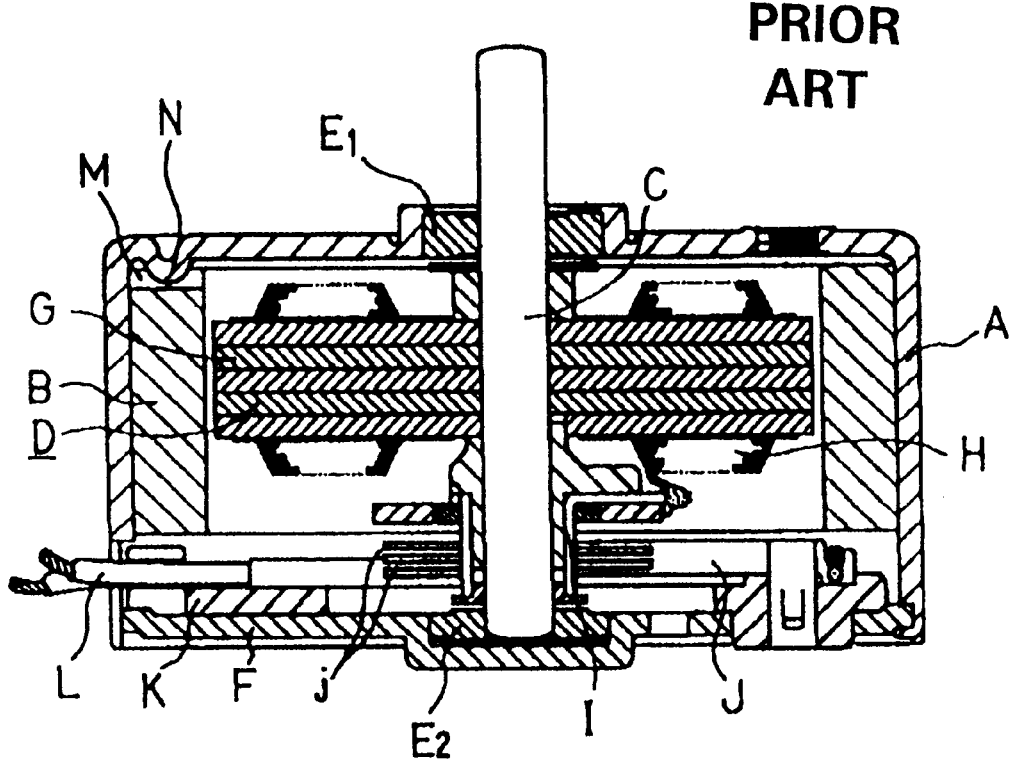
FIG. 3 is a cross-section drawing of a conventional compact motor.

Referring to FIGS. 1 and 2, the following is a detailed description of the preferred embodiments.

Referring to FIG. 1, there is shown a compact DC motor according to a first embodiment of the present invention. As in the conventional technology, a motor case 1 is pressed in the shape of a cup. A ring-shaped resin holder 2, shown in more detail in FIG. 2, is used to mount a pair of C-shaped magnets 3A, 3B into motor case 1. A rotor 5 mounted on a shaft 4 is disposed inside C-shaped magnets 3A, 3B.

A bearing 6A is centered in an end wall of motor case 1. A bearing 6B is disposed on a bracket 7, which covers an open portion of motor case 1. Shaft 4 is rotatably supported between bearing 6A and bearing 6B. A rotor 5 is fixed at an intermediate portion of shaft 4. Rotor 5 includes a star-shaped layered core 5a, an excitation coil 5b, and a commutator 5c.

Referring to FIG. 2, there is shown the relationship between motor case 1 described above and the pair of C-shaped magnets 3A, 3B fixed inside motor case 1 by resin holder 2. Resin holder 2 is molded in the form of a ring with an outer diameter D1 that is slightly larger than an inner diameter D2 of motor case 1.

Resin holder 2 is formed by injection molding an ABS resin or the like to include a pair of arcuate rigid supports 2A which can support C-shaped magnets 3A, 3B. Rigid supports 2A are positioned at equal circumferential intervals and are connected by elastically deformable flexible member 2B so that together they form a ring.

At the ends of each rigid support member 2A of resin holder 2 are integrally formed pairs of support pieces 2a that can come into contact with the end surfaces of C-shaped magnets 3A, 3B, which are molded as arcs having outer diameters that are the same as the inner diameter of motor case 1. The end surfaces of C-shaped magnets 3A, 3B are placed against the side surfaces of corresponding support pieces 2a. This allows C-shaped magnets 3A, 3B to be supported in resin holder 2 so that they cannot be moved toward the center or toward the circumference.

In the embodiment shown in the drawings, flexible members 2B include U-shaped members 2b, which are connected at their ends to rigid supports 2A. Thus, when external circumferential force is applied to rigid supports 2A these U-shaped members 2b are bent and deformed, causing a slight reduction in outer diameter D1 of resin holder 2.

Referring to FIG. 1, positioning projections 9 are formed on the bottom wall of motor case 1. Positioning projections 9 are formed at positions corresponding to grooves 8 of U-shaped members 2b. Thus, when resin holder 2 is mounted in motor case 1, positioning projections 9 are aligned with grooves 8 of U-shaped members 2b so that the circumferential positioning of resin holder 2 is fixed relative to motor case 1.

Referring to the embodiment shown in the drawings, the structure described above supports C-shaped magnets 3A, 3B in resin holder 2 so that C-shaped magnets 3A, 3B are fixed relative to motor case 1 simply by inserting resin holder 2 and C-shaped magnets 3A, 3B into motor case 1. When C-shaped magnets 3A, 3B are supported between support pieces 2a on rigid supports 2A of resin holder 2, resin holder 2 and C-shaped magnets 3A, 3B become integral. Since the resulting structure can be grasped with the fingers, resin holder 2 and C-shaped magnets 3A, 3B can be inserted properly in motor case 1 while maintaining this configuration. Thus, C-shaped magnets 3A, 3B can be fixed in motor case 1 simply by aligning positioning projections 9 with grooves 8 of U-shaped members 2b during insertion.

When this is done, U-shaped members 2b flex outward to mate with the inner diameter D2 of motor case 1. Thus, the outer perimeter surfaces of C-shaped magnets 3A, 3B are fitted tightly against the inner perimeter surface even if there are individual variations in inner diameter D2 of motor case 1 and outer diameter D1 of resin holder 2, as is common due to manufacturing tolerances.

As the description above makes clear, the invention allows C-shaped magnets to be fixed inside a motor case without the use of adhesives. This is achieved by simply inserting the C-shaped magnets supported by the resin holder into the motor case. Thus, even an inexperienced person can mount the C-shaped magnets into a motor case. Also, later misalignment of the C-shaped magnets is prevented.

According to the invention, a simple structure is provided whereby the U-shaped members can flex to accommodate individual variations in dimensions in the motor case and the resin holder. The U-shaped member groove serves as a positioning groove.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A compact motor comprising:

a generally cup-shaped motor case;

at least one C-shaped magnet inside said motor case;

a rotor fixed to an intermediate portion of a shaft;

means for rotatably supporting said shaft in said motor case;

a ring-shaped resin holder;

said motor case including positioning means depending from a closed end of said cup-shaped motor case;

said ring-shaped resin holder including alignment means for aligning a rotational position of said ring-shaped resin holder in said motor case;

a support integrally formed in said ring-shaped resin holder to which said at least one C-shaped magnet is fittable; and said ring-shaped resin holder and said at least one C-shaped magnet being insertable as a unit into said cup-shaped motor case;

said positioning means cooperating with said alignment means such that said ring-shaped resin holder is positively aligned with respect to said generally cup-shaped motor case during insertion, whereby installation and rotational positioning of said at least one C-shaped magnet is simplified.

2. A compact motor as recited in claim 1 wherein:

said ring-shaped resin holder has an outer diameter;

said cup-shaped motor case has an inner diameter; and said outer diameter of said ring-shaped resin holder is slightly larger than said inner diameter of said cup-shaped motor case.

3. A compact motor as recited in claim 1 wherein:

said cup-shaped motor case has an inner diameter;

said ring-shaped resin holder has an outer diameter;

said ring-shaped resin holder including a pair of arcuate rigid supports positioned at equal circumferential intervals along said ring-shaped resin holder;

support pieces formed at ends of said arcuate rigid supports;

said support pieces having an arced shape corresponding to said outer diameter;

said outer diameter is substantially the same as said inner diameter;

at least one flexible member joining ends of said arcuate rigid supports to form a generally ring-shaped resin holder.

4. A compact motor as recited in claim 1 wherein:

said cup-shaped motor case has an inner diameter;

said ring-shaped resin holder has an outer diameter;

said ring-shaped resin holder including a pair of arcuate rigid supports positioned at equal circumferential intervals along said ring-shaped resin holder;

support pieces formed at ends of said arcuate rigid supports;

said support pieces having an arced shape corresponding to said outer diameter;

said outer diameter is greater than said inner diameter;

at least one flexible member joining ends of said arcuate rigid supports to form a generally ring-shaped resin holder; and said at least one flexible member including a U-shaped member having first and second flexible support pieces forming a U-shape such that said outer diameter is slightly reduced when a circumferential force is applied to said rigid support permitting insertion of said ring-shaped resin holder into said cup-shaped motor case.

5. A compact motor as recited in claim 1 wherein:

said ring-shaped resin holder including a pair of arcuate rigid supports positioned at equal circumferential intervals along said ring-shaped resin holder; and at least one flexible member joining ends of said arcuate rigid supports to form said generally ring-shaped resin holder.

6. A compact motor as recited in claim 5 wherein:

said ring-shaped resin holder has an outer diameter; and said at least one flexible member including a U-shaped member having first and second flexible support pieces forming a U-shape such that said outer diameter is slightly reduced when said ring-shaped resin holder is inserted into said generally cup-shaped motor case.

7. A compact motor as recited in claim 6 wherein said motor case positioning means includes positioning projections and said positioning projections extend from a closed end of said cup-shaped motor.

8. A compact motor as recited in claim 6 wherein:

said motor case positioning means includes positioning projections;

said ring-shaped resin holder alignment means includes said U-shaped member; and said positioning projections extend from a closed end of said cup-shaped motor to said U-shaped member of said ring-shaped resin holder such that said U-shaped member engages said positioning projections to align said ring-shaped resin holder in said cup-shaped motor case.

9. A compact motor comprising:

a generally cup-shaped motor case;

at least one C-shaped magnet inside said motor case;

a rotor fixed to an intermediate portion of a shaft;

means for rotatably supporting said shaft in said motor case;

a ring-shaped resin holder;

said motor case and said ring-shaped resin holder including engaging means for establishing a rotational position of said ring-shaped resin holder in said motor case;

a support integrally formed in said ring-shaped resin holder to which said at least one C-shaped magnet is fittable;

said ring-shaped resin holder and said at least one C-shaped magnet being insertable as a unit into said cup-shaped motor case, whereby installation and rotational positioning of said at least one C-shaped magnet is simplified;

said resin holder including at least first and second arcuate rigid supports having a curvature generally similar to an inside curvature of said cup-shaped motor case;

at least first and second flexible members connecting ends of said first and second rigid supports;

said flexible members permitting deformation thereof to reduce a diameter across said at least first and second arcuate rigid supports to a value permitting insertion thereof into said cup-shaped motor case, and thereafter expanding to urge said at least first and second arcuate rigid supports into contact with an interior of said cup-shaped motor case;

at least first and second support pieces depending from said at least first and second arcuate rigid supports; and end surfaces of said at least one C-shaped magnet engaging said at least first and second support pieces, whereby said at least one C-shaped magnet is rotationally positioned relative to said ring-shaped resin holder.

10. A compact motor as recited in claim 9 wherein:

said at least first and second flexible members including a U-shaped member connected on both ends to said rigid supports; and said engaging means including a positioning projection of said motor case fittable into a groove formed by said U-shaped member.

11. A stator for a compact motor comprising:

a cup-shaped motor case;

said cup-shaped motor case having an open end and a generally cylindrical inner surface;

a resin holder;

said resin holder including first and second arcuate rigid supports;

at least one flexible member joining ends of said first and second arcuate rigid supports to form a generally ring-shaped resin holder having a diameter slightly larger than said inner surface;

said at least one flexible member including a U-shaped member having first and second flexible support pieces forming a U shape;

first and second C-shaped magnets;

said first and second C-shaped magnets having an outside curvature generally the same as said inner surface;

first and second rigid support pieces dependent from said first arcuate rigid support;

opposed ends of said first C-shaped magnet being fittable against said first and second rigid support pieces;

third and fourth rigid support pieces dependent from said second arcuate rigid support;

opposed ends of said second C-shaped magnet being fittable against said third and fourth rigid support pieces;

said first and second C-shaped magnets and said resin holder being supportable as a unit by a hand of an installer, whereby installation of said resin holder and said first and second C-shaped magnets is enabled;

said at least one flexible member having sufficient flexibility to permit compression of said resin holder enough to reduce an outside diameter of said resin holder sufficiently to permit insertion of said resin holder into said cup-shaped motor case, and sufficient resiliency to thereafter urge said resin holder and said first and second C-shaped magnets outward into frictional contact with said inner surface;

a positioning projection depending from a closed end of said cup-shaped motor case; and said positioning projection fitting into said U shape when proper orientation of said C-shaped magnets is attained.

* * * * *